Feb. 25, 1941.  E. L. ALEXANDER  2,232,992
POWER TAKE-OFF MOUNTING
Filed April 19, 1940  2 Sheets-Sheet 1

INVENTOR
Emmett L. Alexander.
BY
ATTORNEY

Feb. 25, 1941.  E. L. ALEXANDER  2,232,992
POWER TAKE-OFF MOUNTING
Filed April 19, 1940   2 Sheets-Sheet 2
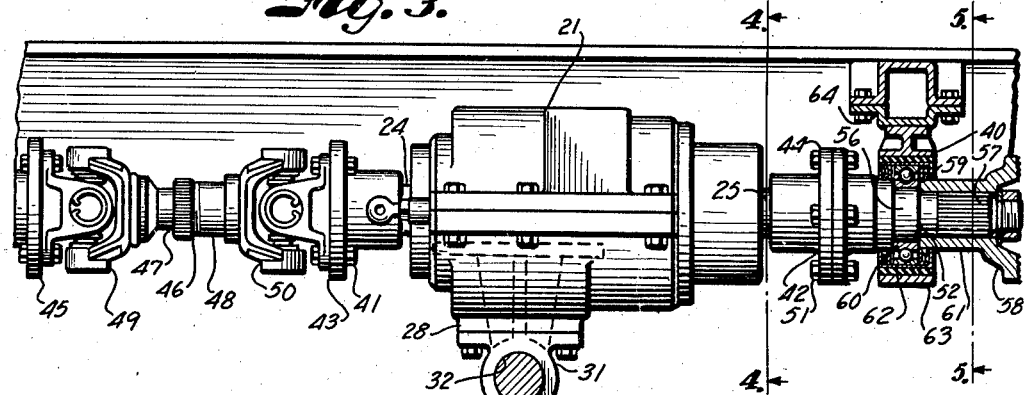
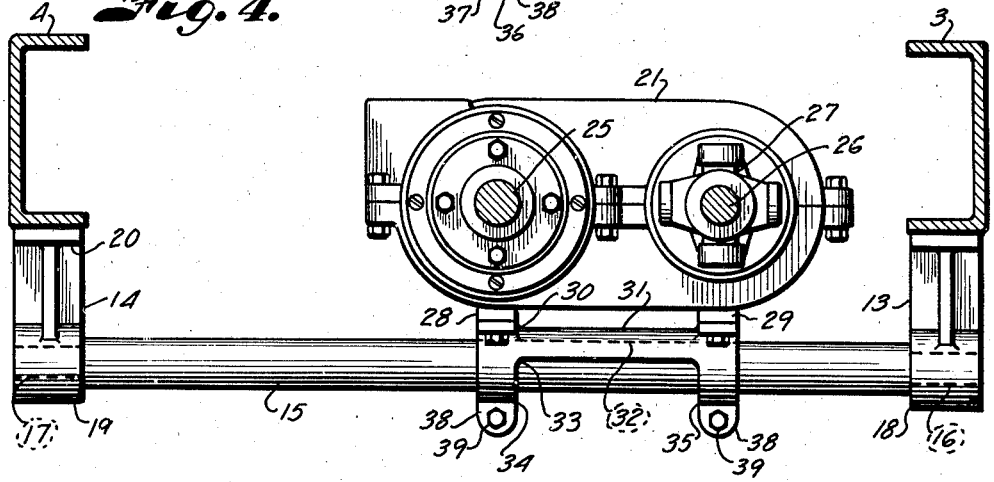
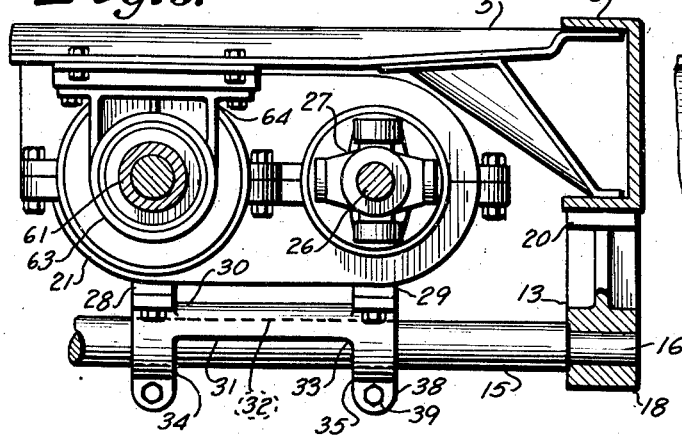
INVENTOR
Emmett L. Alexander
BY
ATTORNEY Patented Feb. 25, 1941

2,232,992

UNITED STATES PATENT OFFICE 2,232,992

POWER TAKE-OFF MOUNTING

Emmett L. Alexander, Enid, Okla., assignor to The George E. Failing Supply Company, Enid, Okla., a corporation of Oklahoma Application April 19, 1940, Serial No. 330,537

9 Claims. (Cl. 180—53)

This invention relates to power take-off devices used in connection with the transmission mechanism of a motor vehicle or truck, and has for its principal object to provide a power take-off having floating support within the vehicle frame to avoid loading and successive wear on the shaft bearings incidental to deflection of the frame.

Other objects of the invention are to provide a power take-off mounting wherein the gear case is substantially balanced on its support; to provide a short flexible connection with the transmission for permitting relative lateral and lengthwise movement of the power take-off; and to provide a power take-off mounting that is readily adapted to standard motor trucks and similar vehicles.

In accomplishing these and other objects of the invention, I have provided improved details of structure, the preferred form of which is illustrated in the accompanying drawings, wherein:

Fig. 3 is a longitudinal section on the line 3—3 of Fig. 2.

Fig. 4 is a cross-section on the line 4—4 of Fig. 3.

Fig. 5 is a partial cross-section on the line 5—5 of Fig. 3, particularly illustrating the pillow block bearing of the motor vehicle.

Fig. 6 is a section through a pillow bearing of different design.

Figure 1:
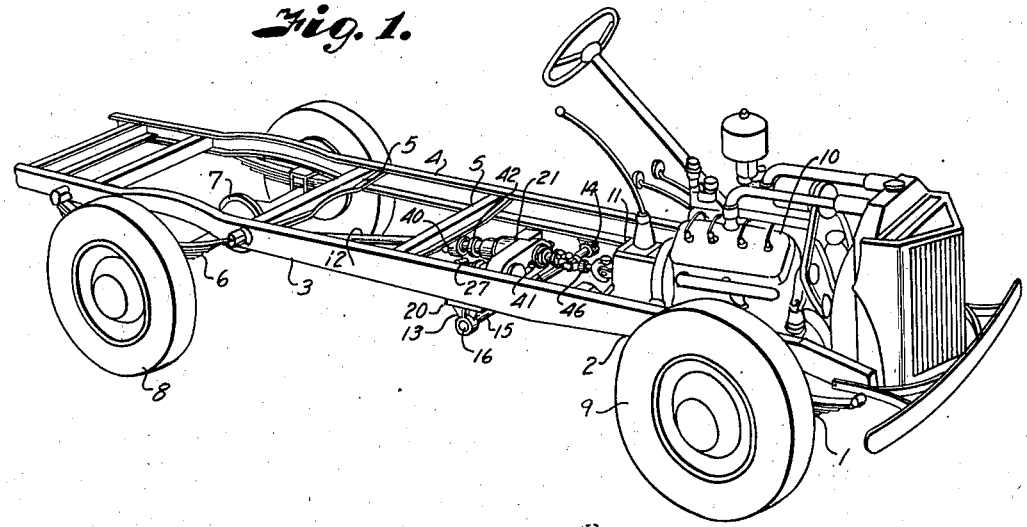
Fig. 1 is a perspective view of the chassis of a motor vehicle truck equipped with a power take-off embodying the features of the present invention.
Figure 2:
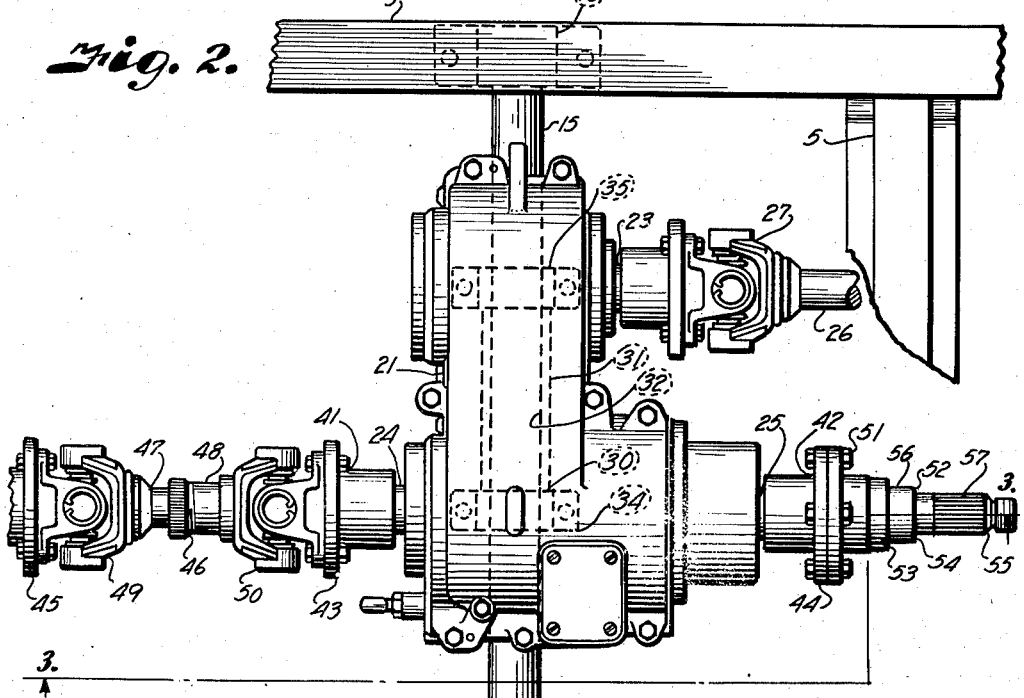
Fig. 2 is an enlarged plan view of the power take-off and the adjacent portions of the vehicle frame.

Referring more in detail to the drawings:

1 designates a well known type of motor vehicle truck including a frame 2 having longitudinal sills 3 and 4 connected by cross sills 5. The rear end of the frame is carried on springs 6 which are mounted upon the ends of an axle unit 7 including the drive wheels 8. The forward end of the frame is supported by the usual steering wheels 9 and carries the power unit 10, which, in the illustrated instance, is shown as a conventional type internal combustion engine. The engine 10 is connected through a multispeed transmission 11 with a propeller shaft 12 to effect actuation of the wheels 8. The structure thus far described is conventional in design for commercial motor vehicle trucks.

It is desirable to provide motor vehicle trucks with a power take-off mechanism whereby the power of the engine may be utilized for actuating various mechanisms transported thereon or operated thereby, for example hoists, rotary drilling rigs, refrigeration machines, concrete mixers, and many other mechanisms too numerous to mention.

In equipping a motor truck with a power take-off mechanism, it has been the usual practice to provide rigid support of the gear case in an attempt to retain the various shaft bearings in alignment, when the power take-offs are thus mounted, the shaft bearings are subjected to excessive wear especially during flexure of the frame. To overcome this difficulty, I have provided a floating mounting for the gear case of the power take-off whereby it is self-adjusting relatively to the shaft bearings incidental to flexure of the frame or any relative movement of the shaft bearings with respect thereto, as now to be described.

Attached to the under sides of the sills 3 and 4 at aligned points intermediate the propeller shaft 12 and multispeed transmission 11 are brackets 13 and 14 carrying a transverse support 15, which, in the illustrated instance, comprises a cylindrical bar having trunnion ends 16 and 17 supported within bearings 18 and 19 of the respective brackets, the base portions 20 of the brackets being of suitable length to support the bar 15 at such a distance below the frame that the power input shaft of the power take-off substantially aligns with the power delivery shaft of the transmission 11.

The power take-off includes a gear case 21 which is of size and shape to accommodate the various gears and clutches used to connect a power take-off shaft 23, the particular form of which has no bearing on the present invention, the point being that the power take-off has shaft connections 24 and 25 suitably journalled in the ends of the gear case and adapted to be respectively connected with the transmission 11 and the propeller shaft 12 whereby the power of the motor 10 may be applied through the power take-off to the drive wheels 8. The power take-off shaft 23 may project in appropriate direction from the gear case and connect with the mechanism to be driven thereby through a shaft 26 having flexible connection with the shaft 23 by means of a universal joint 27.

Formed on the bottom face of the gear case and preferably aligned with the shaft 23 and the shaft connections 24 and 25 are pads 28 and 29 located transversely of a plane extending through the center of gravity of the power take-off mechanism. Secured to these pads is a saddle-like clamp 30 including a sleeve portion 31 having a bore 32 to snugly receive the support bar 15. The intermediate lower portion of the sleeve is cut away as at 33 to provide clamps 34 and 35 which are slit longitudinally as at 36 and have ears 37 and 38 for mounting clamping bolts 39 by which the gear case is clamped to the bar so that it may be adjusted longitudinally thereon to align the axis of the shaft connection 24 with the power output shaft of the transmission and the shaft connection 25 with a pillow block bearing 40 suspended from the adjacent cross member 5 of the vehicle frame. The shaft connections 24 and 25 of the power take-off include collars 41 and 42 having coupling flanges 43 and 44.

In order that the power take-off may rock, the flange 43 is connected with a similar flange 45 on the output shaft of the transmission 11 by a relatively short flexible connection 46. In the illustrated instance the flexible connection includes telescoping shaft sections 47 and 48 having splined interconnection (not shown), and respectively connected through universal joints 49 and 50 with the flanges 45 and 43.

It is thus obvious that any relative movement occurring between the power take-off and the transmission 11 incidental to flexure of the vehicle frame or any other cause will be compensated for by the flexible connection. Connected with the flange 44 by suitable fastening devices 51 is a stub shaft 52 having stepped shoulders 53, 54 and 55 to form a pillow block bearing engaging portion 56 and a reduced shank 57 for connection through a universal joint 58 with the propeller shaft 12, the stub shaft being journalled within the pillow block on an antifriction bearing 59 including an inner race 60 engaged between the shoulder 53 and the sleeve 61 of the universal joint as shown in Fig. 3. The bearing also includes an outer race 62 which is mounted within a resilient pad carried by the pillow block housing ring 63. The housing ring 63 is rigidly supported below the cross sill 5 by a suitable bracket 64. The resilient pad of the pillow block thus cooperates with the flexible connection to allow self-adjustment of the power take-off with the driving and driven sections of the propeller shaft of the truck so as to avoid undesirable loading of any of the bearings incidental to any deflection in the frame. The substantial balance of the power take-off upon its supporting bar also relieves the weight thereof from the bearings and the supporting bar takes the torque incidental to the drive through the power take-off whether the drive be effected through the wheels of the vehicle or through the power take-off shaft.

The form of pillow block shown in Fig. 6 includes a self-aligning antifriction bearing 65 which is used to obtain the self-adjustment afforded by the resilient pad shown in Fig. 3.

From the foregoing it is obvious that I have provided a power take-off mounting whereby the power take-off is self-adjusting to any distortion or deflection occurring in the frame tending to disalign the transmission shaft with the propeller shaft of the vehicle, thereby avoiding excessive wear and undesirable loading on any of the shaft bearings.

What I claim and desire to secure by Letters Patent is:

1. In a motor vehicle including a frame, a multispeed transmission and a propeller shaft, a power take-off interposed between the transmission and the propeller shaft, means connecting the power take-off with the transmission and the propeller shaft, and supporting means on the frame extending across the power take-off at a point intermediate the ends thereof to mount the power take-off for rocking movement in the frame to compensate for relative movement between the transmission and propeller shaft.

2. In a motor vehicle including a frame, a multispeed transmission and a propeller shaft, a power take-off interposed between the transmission and the propeller shaft and having shaft connections at opposite ends thereof, flexible means connecting one of the shaft connections of the power take-off with the transmission, means connecting the other connection of the power take-off with the propeller shaft, a self-adjusting pillow block on the frame for supporting said last named connection, and means mounting the power take-off for rocking movement in the frame to compensate for relative movement between the transmission and propeller shaft.

3. In a motor vehicle including a frame having side sills and a cross sill, a multispeed transmission, a propeller shaft, a pillow block bearing on the cross sill supporting the propeller shaft, a power take-off including a case having shaft connections rotatably supported thereby and provided with couplings, a flexible connection connecting said transmission with one of the couplings, a connecting member journalled in the pillow block bearing and connecting the other coupling with the propeller shaft, a cross bar having journalled support from the side sills, a saddle connected with the power take-off case, and clamping means securing the saddle to said cross bar.

4. In a motor vehicle including a frame having side sills, a cross sill, a multispeed transmission, a propeller shaft, and a pillow block bearing on the cross sill supporting the propeller shaft, a power take-off including a case having shaft connections supported by said case and provided with couplings, a flexible connection connecting said transmission with one of the couplings, means connecting the other coupling with the propeller shaft, said pillow block bearing on the cross sill supporting the last named connection, a cross bar having journalled support from the side sills, and a saddle connected with the power take-off and mounted on the cross bar to support said power take-off for rocking movement with respect to the transmission and said pillow block bearing.

5. In a motor vehicle including a frame having a cross sill, a multispeed transmission on the frame, a propeller shaft, and a self-aligning pillow block bearing on the cross sill, the combination of a power take-off including a casing, power transmitting means rotatable in the casing and having support in said bearing, a pair of telescoping shaft sections, universal joints respectively connecting said shaft sections with the transmission and with said power transmitting means, means connecting the power transmitting means with the propeller shaft, and means pivotally supporting the power take-off casing in the frame.

6. In a motor vehicle including a frame having a multispeed transmission on the frame, a propeller shaft, and a self-aligning pillow block bearing on the frame, the combination of a power take-off including a casing, shaft connections rotatably supported by the casing, a pair of telescoping shaft sections, universal joints respectively connecting said shaft sections with the transmission and with one end of said shaft connections, means journalled in said pillow block bearing and connecting the other shaft connection of the power take-off with the propeller shaft, a supporting bar for the power take-off casing, means securing the casing to said bar, trunnions on the ends of said bar, bearings for said trunnions, and means securing the bearings to said frame.

7. A motor vehicle including a frame having side sills and a cross sill, a multispeed transmission on the frame, a propeller shaft, a self-aligning pillow block bearing on the cross sill, a power take-off including a casing, shaft connections rotatably supported by the casing, a pair of telescoping shaft sections, universal joints respectively connecting said shaft sections with the transmission and with one of said power take-off shaft connections, means journalled in the self-aligning pillow block bearing for connecting the other of the power take-off shaft connections with the propeller shaft, a supporting bar for the power take-off casing, means clampingly securing the casing to said bar, trunnions on the ends of said bar, bearings for said trunnions, and means securing the bearings to the side sills of said frame.

8. In a motor vehicle having a pair of spaced shafts, a power take-off interposed between said shafts including a casing, a self-aligning pillow block bearing supporting one of the shafts, means rigidly connecting said pillow block supported shaft with the power take-off, a flexible connection between the other shaft and the power take-off, a trunnion member arranged transversely of the casing at substantially the center of gravity of said power take-off, means on the vehicle for journalling the trunnion member, and means connecting the trunnion member with said casing.

9. In a motor vehicle having a pair of spaced shafts, a power take-off interposed between said shafts including a casing, a self-aligning pillow block bearing supporting one of the shafts, means rigidly connecting said pillow block supported shaft with the power take-off, a flexible connection between the other shaft and the power take-off, a trunnion member arranged transversely of the casing at substantially the center of gravity of said power take-off, means on the vehicle for journalling the trunnion member, and clamping means connected with the casing and having adjustment on the trunnion member to position said power take-off in alignment with said shafts.

EMMETT L. ALEXANDER.